May 5, 1970 P. D. HEATH 3,510,764
METHOD OF MEASURING DIELECTRIC CONSTANT VARIATIONS
Filed June 22, 1967
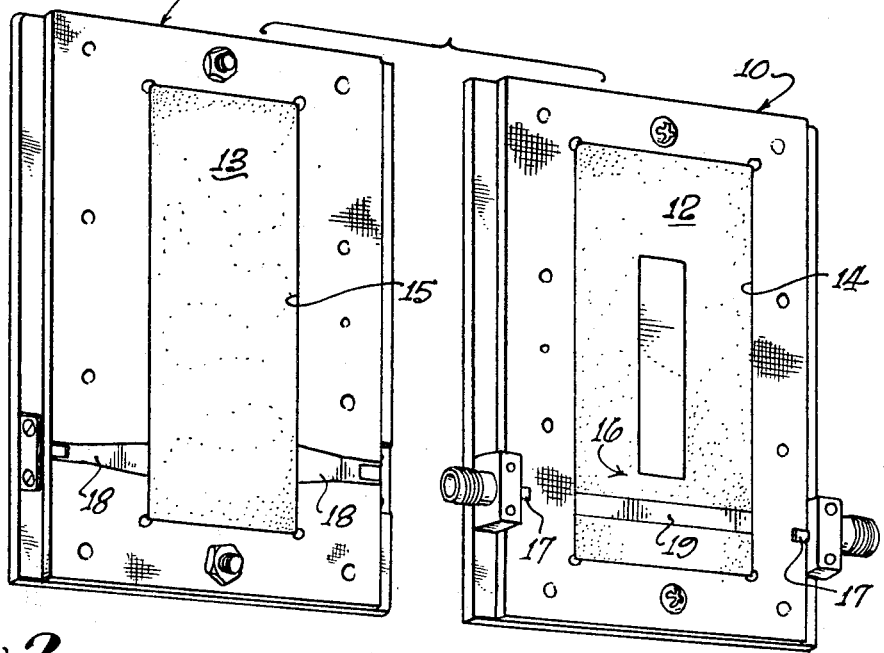
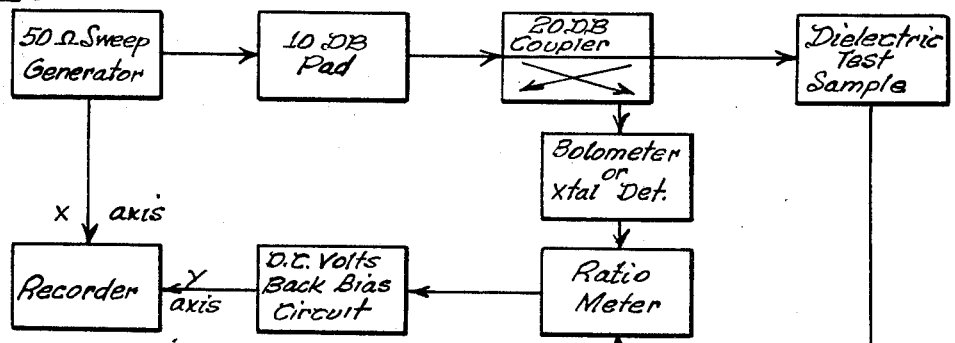
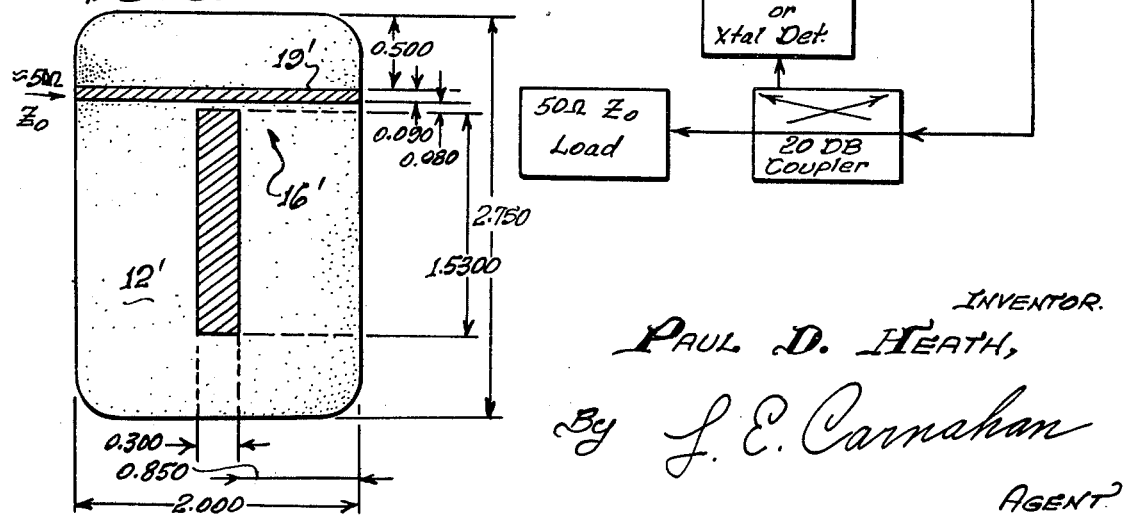
INVENTOR.
PAUL D. HEATH,
By L. E. Carnahan
AGENT

United States Patent Office 3,510,764
Patented May 5, 1970

3,510,764
METHOD OF MEASURING DIELECTRIC CONSTANT VARIATIONS
Paul D. Heath, Phoenix, Ariz., assignor to General Dynamics Corporation, a corporation of Delaware
Filed June 22, 1967, Ser. No. 648,094
Int. Cl. G01r 27/04
U.S. Cl. 324—58.5      4 Claims

ABSTRACT OF THE DISCLOSURE

This disclosure relates to a technique useful in the microwave measurement of the dielectric constant of selected materials where extremely tight tolerances are mandatory. This technique is that of measuring the resonant frequency of a half wavelength resonator which is tightly sandwiched between sheets of sample material, the resonant frequency being directly related to the dielectric constant of the material. The resonant sandwich is preferably formed by the face-to-face joining of two strips of sample material each having a conductive coating on the non-contacting faces, and with the contacting face of one strip being barren of any coating and the contacting face of the other strip being conductively coated with a half wavelength resonant circuit configuration. Measurement of the resonant frequency may be made by way of any of many microwave frequency measuring systems, the configuration of one such system being specifically set forth by way of example.

BACKGROUND OF THE INVENTION

This invention relates to a method of measuring dielectric constant variations, and more particularly to such a method which utilizes the resonant frequency of a half wavelength resonator to measure the dielectric constant of a material.

While many prior art methods for measuring the dielectric constant of sample materials by way of microwave are known, the employment of a half wavelength resonator technique as set forth hereinafter is a novel approach which greatly advances the state of the art.

SUMMARY OF THE INVENTION

Therefore, it is an object of this invention to provide a method of measuring the dielectric constant of various material.

A further object of the invention is to provide a method for accomplishing the measurement of the dielectric constant of various plastic and ceramic materials for stripline fabrication.

Another object of the invention is to provide a method of measuring dielectric constant variations which utilizes the resonant frequency of a half wavelength resonator.

Another object of the invention is to porvide a method of the measuring dielectric constant of various materials by the use of a half wavelength resonator tightly sandwiched between sheets of the material being measured.

Another object of the invention is to provide a method for measuring the dielectric constant of various materials by measuring the resonant frequency of a half wavelength resonator which is tightly sandwiched between sheets of material to be measured, the resonant frequency being directly related to the dielectric constant of the material, the measurement of the resonant frequency being made by a microwave frequency measuring system.

Other objects of the invention will become readily apparent from the following description and accompanying drawings wherein;

FIG. 1 is a view of an embodiment of a circuit board assembly for a half wavelength resonator mounted for sandwiching between sheets of material of which the dielectric constant thereof is to be measured;

FIG. 2 is a block diagram of an embodiment of a microwave frequency measuring system utilized in carrying out the invention; and FIG. 3 is a view of a specifically configured embodiment of a half wavelength resonator utilized in carrying out the invention.

This invention is based on the novel concept that dielectric tolerances can be measured by means of a half wavelength resonator. When this resonator is tightly sandwiched within a dielectric medium it will change its resonant frequency $f$ according to the equation:

$$f = \frac{2c}{\lambda(\epsilon)^{\frac{1}{2}}}$$

where:

$c = 3 \times 10^8$ meters per second
$f =$ cycles per second
$\lambda =$ length of resonator in meters
$\epsilon =$ dielectric constant By holding $\lambda$ constant, temperature constant, and changing the dielectric material, very small changes in the dielectric constant can be detected by a change in the resonator resonant frequency. The change in the dielectric constant between two samples is then related by the equation:

$$\epsilon_2 = \epsilon_1 \left(\frac{f_1}{f_2}\right)^2$$

where:

$\epsilon_2 =$ dielectric constant of reference sample
$f_1 =$ resonant frequency of reference sample
$\epsilon_2 =$ dielectric constant of test sample
$f_2 =$ resonant frequency of test sample The procedure for accomplishing the measurement of the dielectric constant of various plastic and ceramic materials, in accordance with the invention, utilized, for example, in stripline fabrication is outlined in the following steps with reference to the accompanying drawings:

(1) Cut from a board whose dielectric constant is to be measured a strip of the correct width and length to fit the resonator circuit board or support structure composed of sections or plates 10 and 11 of FIG. 1. (The resonator of FIG. 3 is for use in S-band applications with double clad plastic type materials approximately $\frac{1}{16}$ inch thick, such as polyethylene and Teflon-fiber glass. However, it may be used at higher multiple frequencies such as twice fundamental, three times fundamental, etc.)

(2) From this strip, cut two pieces of the double clad material generally indicated at 12 and 13, and which may be ceramic or other high K material, to fit the recessed portions or cavities 14 and 15, respectively of support sections or plates 10 and 11.

(3) Etch the half wave resonator circuit generally indicated at 16 in FIG. 1 on the cladding of the upper side of the piece 12 taking care to preserve the conductive coating or cladding (not shown) on the opposite side of the piece. (A specific configured piece 12' with circuit 16' etched thereon is shown in FIG. 3.) The cladding may be copper or other low loss conductive material.

(4) Etch away the complete conductive coating of cladding from the upper side of the piece 13, also preserving the conductive coating (not shown) on its opposite side.

(5) Make a sandwich of the two pieces 12 and 13 with the circuit 16 side of piece 12 and the bare insulating side of the piece 13 facing each other.

(6) Place the thus sandwiched pieces 12 and 13 in the support structure or board sections or plates 10 and 11 so that the in-line connectors 17 and 18 thereof mate properly with the ends of the $Z_0$ line load line 19 of test piece 12 containing the λ/2 resonator circuit 16. The $Z_o$ line may be 50 ohms as indicated in FIG. 3 at 19'. The in-line connectors 18, as shown, serve as matching sections to correct VSWR to unity at 50 ohm connectors.

(7) Clamp the support sections or plates 10 and 11 with pressure just sufficient to eliminate any air gaps over the surface of the resonator 16 without deforming it. (Ceramic type surfaces may have to be ground flat prior to conductor disposition.)

(8) Measure the resonant frequency using the set up of FIG. 2 or any known microwave frequency measuring system.

(9) Compute the dielectric constant of the material by using the following formula:

$$K = \left[ \frac{3 \times 10^8 \times 39.37}{f \times 10^9 \times \text{\textit{l}} \times 2 \times 1.04} \right]^2$$

where:

K = dielectric constant
$f \times 10^9$ = frequency in cycles
$\textit{l}$ = resonator length in inches (λ/2)
1.04 = an allowance for capacity fringing effects. (This varies with dielectric constant, ground plane spacing, and whether λ/2, λ, 3/2λ, etc. operation.)

(10) When testing laminated type material, dry test pieces under vacuum and heat >212° F. to draw off any moisture that has wicked in along the fibers. If necessary, seal edges of the support or board with a Teflon coating after dehumidifying.

(11) Other impedance levels can be used beside the normal 50 ohm $Z_o$ provided the line 19 on the test piece 12 is altered or matching sections are used at each end. The measuring system of FIG. 2 should be reasonably well matched throughout to prevent reactive coupling to the resonator 16.

Tests have shown that the inventive method when used to grade the dielectric constant gives an accuracy consistent within the accuracy of the frequency meters available. Due to the simplicity of this method, the measurements can be made by personnel not familiar with the existing and more complicated methods.

Also, tests have shown that with the inventive method, the insulation sheet material can also be evaluated prior to deposition of the copper or other type cladding thereon; this enables a manufacturer to select, from stock, the laminate material for a specific requirement, and then process it for the copper or other material thickness requirement.

For testing unclad material a slip-in test piece, such as indicated at 12 in FIG. 1, molded of a plastic such as General Electric PPO (Z-tron G) may be made by making the resonator 16 from Invar; gold plated (3 skin depths thick), the PPO having a K of 2.57 from —100° F. to +350° F. Invar is a highly temperature-stable nickel steel containing approximately 36% nickel.

It has thus been shown that the present invention provides a simple yet effective method of measuring the dielectric constant of various material, thus advancing the state of this art.

What I claim is:

1. A method for measuring the dielectric constant of various materials comprising the steps of: cutting two flat pieces of a material to be tested, forming a half wavelength resonator circuit and a load line circuit on one of said pieces, sandwiching the two pieces together such that the formed circuits are substantially intermediate the resulting sandwich, placing the sandwiched pieces in a support structure having connectors adapted to align with the load line of the resonator, applying sufficient pressure to the support structure to eliminate air gaps over the surface of the resonator, measuring the resonant frequency of the resonator by attaching the support structure to a microwave frequency measuring system; and computing the dielectric constant of the material being tested.

2. The method defined in claim 1, wherein said circuit forming step includes the step of etching said circuits.

3. The method defined in claim 1, wherein said circuit forming step comprises the steps of making said circuits from Invar and gold plating said Invar.

4. The method defined in claim 1, wherein said measuring step includes the step of matching the impedance of said measuring system throughout to prevent reactive coupling to said resonator circuit.

References Cited

Hakki et al., "A Dielectric Resonator Method of Measuring Inductive Capacities in the Millimeter Range," IEEE Trans. on Microwave Theory and Techniques, vol. MTT-8, No. 4, pp. 402–410, July 1960.

Cohn et al., "Microwave Measurement of High Dielectric Constant Materials," IEEE Trans. on Microwave Theory and Techniques, vol. MTT-14, No. 9, September 1966.

RUDOLPH V. ROLINEC, Primary Examiner

M. J. LYNCH, Assistant Examiner